(12) United States Patent
Avidar et al.

(10) Patent No.: US 10,425,340 B2
(45) Date of Patent: Sep. 24, 2019

(54) GLOBAL OPTIMIZATION AND LOAD BALANCING IN NETWORKS

(71) Applicant: TERIDION TECHNOLOGIES LTD., Petach Tikva (IL)

(72) Inventors: Jacob Avidar, Natanya (IL); Elad Rave, Ramat Gan (IL); Lior Musman, Ein Sarid (IL)

(73) Assignee: Teridion Technologies LTD, Petach Tikva (IL)

( * ) Notice: Subject to any disclaimer, the term of this patent is extended or adjusted under 35 U.S.C. 154(b) by 0 days.

(21) Appl. No.: 15/478,431

(22) Filed: Apr. 4, 2017

(65) Prior Publication Data

US 2017/0310595 A1    Oct. 26, 2017

(30) Foreign Application Priority Data

Apr. 5, 2016    (IL) .......................................... 244937

(51) Int. Cl.
| | |
|---|---|
| *G06F 15/173* | (2006.01) |
| *H04L 12/803* | (2013.01) |
| *G06Q 10/04* | (2012.01) |
| *H04L 12/721* | (2013.01) |
| *G01C 15/00* | (2006.01) |
| *H04L 12/801* | (2013.01) |

(52) U.S. Cl.
CPC .......... *H04L 47/125* (2013.01); *G01C 15/004* (2013.01); *G06Q 10/047* (2013.01); *H04L 45/12* (2013.01); *H04L 45/124* (2013.01); *H04L 47/10* (2013.01); *H04L 47/12* (2013.01)

(58) Field of Classification Search
CPC ... H04L 47/125; H04L 47/124; H04L 45/124; H04L 45/12; H04L 47/12; H04L 47/10; G01C 15/004; G06Q 10/047

USPC ......... 709/231, 241; 370/351, 400, 235, 352
See application file for complete search history.

(56) References Cited

U.S. PATENT DOCUMENTS 6,314,093 B1 * 11/2001 Mann .................. H04L 3/24
                                                      370/351
7,561,526 B2    7/2009 Naden et al.
(Continued)

FOREIGN PATENT DOCUMENTS

EP    0926860 A2    6/1999
EP    1561311 A1    8/2005
(Continued)

OTHER PUBLICATIONS

Canadian Patent Application 2,963,098, Notification of a Requisition by the Examiner, dated Dec. 28, 2017.
(Continued)

*Primary Examiner* — Thuong Nguyen
(74) *Attorney, Agent, or Firm* — Brian R. Short

(57) ABSTRACT

Method and apparatus for globally optimizing a weighted flow network, including the procedures of collecting a plurality of metrics in the weighted flow network, receiving a plurality of route requests from a first node to a second node in the weighted flow network, determining K best routes out of N possible routes from the first node to the second node according to the plurality of metrics, balancing a load in the weighted flow network by distributing the plurality of route requests over the K best routes from the first node to the second node, and updating the plurality of metrics.

23 Claims, 5 Drawing Sheets

(56) References Cited

U.S. PATENT DOCUMENTS

| | | | |
|---|---|---|---|
| 2005/0254426 A1* | 11/2005 | Simonis | H04L 41/0816 370/235 |
| 2005/0286464 A1 | 12/2005 | Saadawi et al. | |
| 2008/0002670 A1* | 1/2008 | Bugenhagen | H04L 12/66 370/352 |
| 2008/0225718 A1* | 9/2008 | Raja | H04L 67/1008 370/235 |
| 2009/0031415 A1* | 1/2009 | Aldridge | H04L 63/0272 726/15 |
| 2010/0075682 A1 | 3/2010 | del Rio-Romero et al. | |
| 2010/0315950 A1 | 12/2010 | Venkataraman et al. | |
| 2011/0131017 A1* | 6/2011 | Cheng | G05B 19/41885 703/2 |
| 2012/0304234 A1 | 11/2012 | Carbunar et al. | |
| 2013/0227160 A1* | 8/2013 | Labonte | H04L 47/10 709/231 |
| 2013/0338453 A1* | 12/2013 | Duke | A61B 5/7282 600/309 |
| 2013/0343213 A1* | 12/2013 | Reynolds | H04L 43/045 370/252 |
| 2014/0098685 A1 | 4/2014 | Shattil | |
| 2014/0173624 A1 | 6/2014 | Kurabayashi | |
| 2014/0269268 A1 | 9/2014 | Rao | |
| 2014/0280969 A1 | 9/2014 | Wood et al. | |
| 2014/0347994 A1 | 11/2014 | Kapadia et al. | |
| 2014/0359698 A1 | 12/2014 | Sorenson, III et al. | |
| 2014/0379926 A1 | 12/2014 | Patel et al. | |
| 2014/0379927 A1 | 12/2014 | Patel et al. | |
| 2014/0379938 A1 | 12/2014 | Bosch et al. | |
| 2015/0103662 A1 | 4/2015 | Valero et al. | |
| 2015/0301117 A1* | 10/2015 | Wakasugi | G01R 31/382 702/63 |
| 2017/0169356 A1* | 6/2017 | Dousse | H04W 8/245 |

FOREIGN PATENT DOCUMENTS

| | | |
|---|---|---|
| EP | 2232792 A1 | 9/2010 |
| EP | 1561311 B1 | 12/2014 |
| EP | 2899930 A1 | 7/2015 |
| WO | 2004040858 A1 | 5/2004 |
| WO | 2009135981 A1 | 11/2009 |
| WO | 2010032081 A1 | 3/2010 |

OTHER PUBLICATIONS

Extended European Search Report dated Sep. 8, 2017 for European Application No. 17000560.7 (10 Pages).

Liu, Ruilin et al., "Balanced Traffic Routing: Design, Implementation, and Evaluation" Elsevier, Department of Computer Science, Rutgers University, Oct. 2015, pp. 1-26 (26 Pages).

Pan, Juan et al., "Proactive Vehicle Re-Routing Strategies for Congestion Avoidance", Distributed Computing in Sensor Systems, 2012, 8th IEEE International Conference on Distributed Computing in Sensor Systems, May 16, 2012, pp. 265-272 (8 Pages).

Zhou, Junlan et al., "WCMP: Weighted Cost Multipathing for Improved Fairness in Data Centers", Computer Systems, ACM, Apr. 2014, pp. 1-14 (14 Pages).

Office Action dated Dec. 28, 2016 for Israeli Patent Application No. 244937 (3 Pages).

English Translation of Office Action dated Dec. 28, 2016 for Israeli Patent Application No. 244937 (3 Pages).

Office Action Response Filed Mar. 21, 2017 for Israeli Patent Application No. 244937 (3 Pages).

English Translation of Office Action Response Filed Mar. 21, 2017 for Israeli Patent Application No. 244937, Including Clean and Marked Up Claims (19 Pages).

Notice of Allowance dated Mar. 27, 2017 for Israeli Application No. 244937 (3 Pages).

English Translation of Notice of Allowance dated Mar. 27, 2017 for Israeli Application No. 244937 (3 Pages).

* cited by examiner

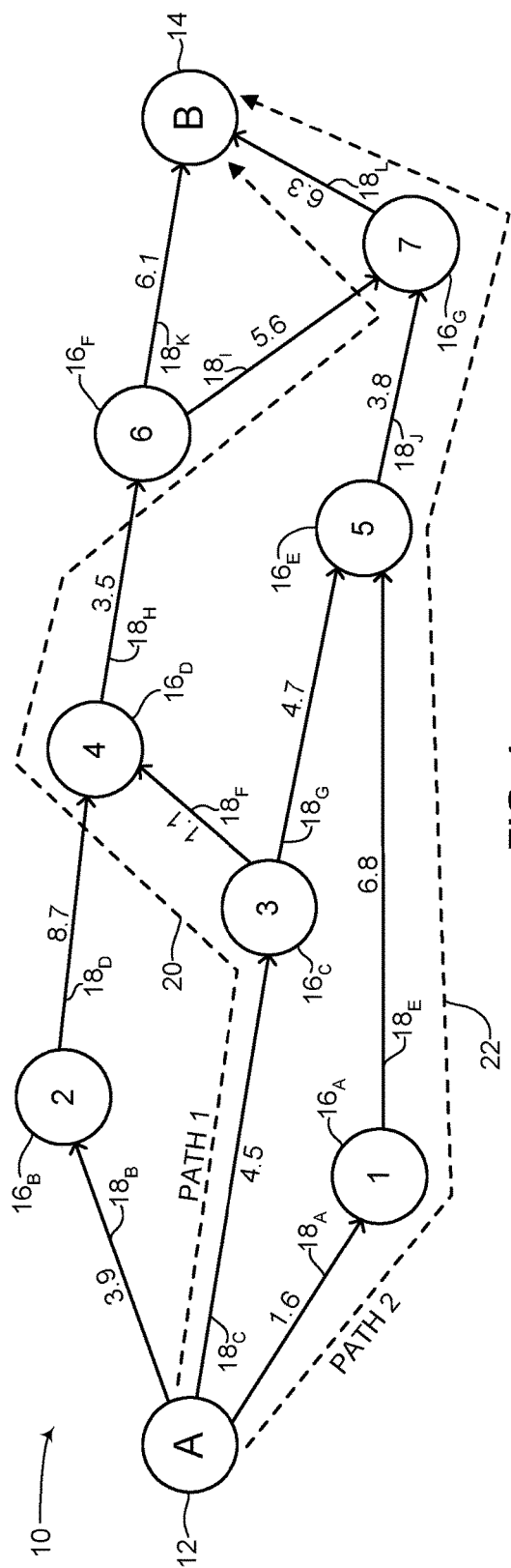
FIG. 1
PRIOR ART
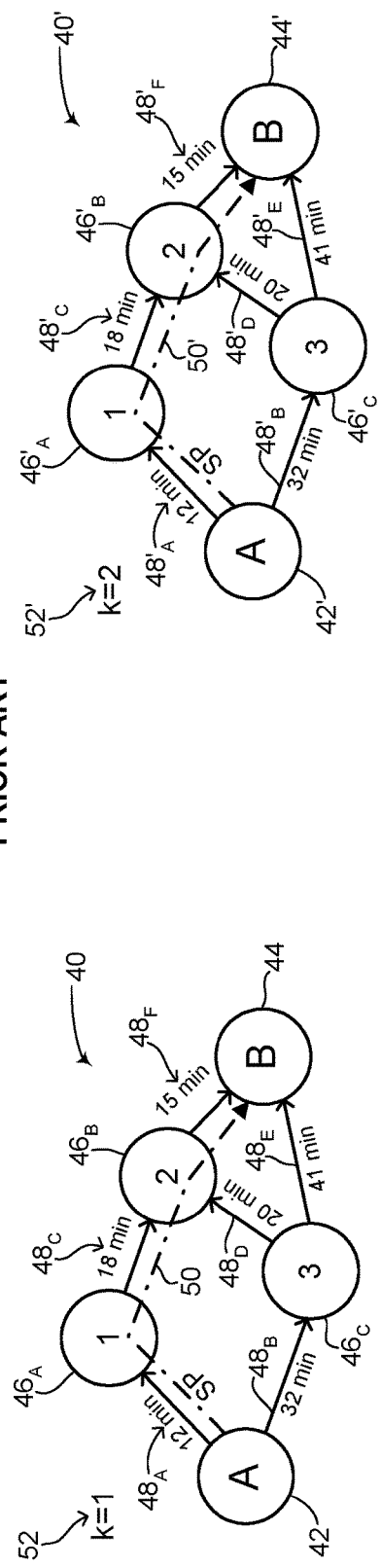
FIG. 2A
PRIOR ART
FIG. 2B
PRIOR ART

GLOBAL OPTIMIZATION AND LOAD BALANCING IN NETWORKS

FIELD OF THE DISCLOSED TECHNIQUE

The disclosed technique relates to load balancing in networks, in general, and to methods and systems for globally optimizing load balanced networks, in particular.

BACKGROUND OF THE DISCLOSED TECHNIQUE

Many optimization problems can be modeled as weighted directed graphs. Graphs are visual and mathematical representations of vertices or nodes which are connected together by edges. A directed graph is where the edges between nodes have a particular direction or flow and is also known as a flow network. A weighted directed graph is a directed graph where each edge is also given a weight. The weight represents a cost for using a particular edge over another. Such graphs are also known as weighted flow networks. Weighted flow networks have found use in problems of logistics, which deal with the movement or flow of goods or objects from one node to another. Such problems include finding a shortest path between two nodes, and have found practical use in optimizing the flow of cars in traffic and information over a network, for example.

Reference is now made to FIG. 1, which is a schematic illustration of a weighted flow network, generally referenced 10, as is known in the prior art. Weighted flow network 10 includes a plurality of vertices 12, 14, $16_A$, $16_B$, $16_C$, $16_D$, $16_E$, $16_F$ and $16_G$. Vertex 12, labeled with an 'A', represents a point of departure, source, start or initial start position. Vertex 14, labeled with a 'B', represents a destination, target, end or end position. Vertices $16_A$-$16_G$, labeled with numbers '1' to '7', represent intermediate nodes via which a good, an object, information and the like can travel from vertex A to vertex B. As shown in weighted flow network 10, not every vertex is connected to every other vertex. Each connection between two vertices is referred to as an edge. Vertex A is connected with vertices 1, 2 and 3 via edges $18_A$, $18_B$ and $18_C$ respectively. Vertex 1 is connected with vertex 5 via an edge $18_E$, vertex 2 is connected with vertex 4 via an edge $18_D$, vertex 3 is connected with vertices 4 and 5 via edges $18_F$ and $18_G$ respectively, vertex 4 is connected with vertex 6 via an edge $18_H$, vertex 5 is connected with vertex 7 via an edge $18_J$, vertex 6 is connected with vertices 7 and B via edges $18_I$ and $18_K$ respectively and vertex 7 is connected with vertex B via an edge $18_L$.

The connections between the vertices show the various paths via which a good or object can travel from vertex A to vertex B. FIG. 1 shows two possible paths, a first path 20, labeled 'PATH 1' and a second path 22, labeled 'PATH 2'. It is obvious that other paths exist, however for the purposes of explanation only two paths are shown in FIG. 1. First path 20 goes from vertex A to vertex 3, vertex 3 to vertex 4, vertex 4 to vertex 6, vertex 6 to vertex 7 and vertex 7 to vertex B. Second path 22 goes from vertex A to vertex 1, vertex 1 to vertex 5, vertex 5 to vertex 7 and vertex 7 to vertex B. As shown in FIG. 1, weighted flow network 10 also includes a plurality of weights associated with each edge. Edge $18_A$ has a weight of 1.6, edge $18_B$ has a weight of 3.9, edge $18_C$ has a weight of 4.5, edge $18_D$ has a weight of 8.7, edge $18_E$ has a weight of 6.8, edge $18_F$ has a weight of 1.1, edge $18_G$ has a weight of 4.7, edge $18_H$ has a weight of 3.5, edge $18_I$ has a weight of 5.6, edge $18_J$ has a weight of 3.8, edge $18_K$ has a weight of 6.1 and edge $18_L$ has a weight of 6.3. Each weight represents a cost or metric associated with using a particular edge. For example, if weighted flow network 10 were used as a model of the flow of current, each weight might represent a capacity of current a particular edge can accommodate, therefore edges with higher weights represents edges that can accommodate more capacity for current. Alternatively, if weighted flow network 10 were used as a model of the flow of traffic, each weight might represent a distance between vertices, therefore edges with higher weights represents edges which are longer in distance. Using the associated weights with each edge, the total cost of a path can be determined. For example, the total cost of first path 20 is 21.0, whereas the total cost of second path 22 is 18.5. An optimization algorithm, such as known shortest path (herein abbreviated SP) algorithms, can be used to determine the shortest path between vertex A and vertex B. Phrased otherwise, the shortest path may be the path with lowest cost, such as in the case that the edges in weighted flow network 10 represent the distance between vertices. However the same SP algorithms can also be used to find the path with the highest cost, such as in the case that the edges represent capacity for current. In such a case, the weights for each edge could be multiplied by −1 and thus a 'shortest' path can be found using such SP algorithms, even though that shortest path (e.g., of resistance) represents one with the highest capacity for current. Such SP algorithms usually determine all possible paths between a start vertex and an end vertex and then determine the cost of each possible path. Depending on how the optimization is phrased, the path with the lowest cost or highest cost is returned as the optimal path to be taken to go from vertex A to vertex B.

The weighted flow network shown in FIG. 1 is used by many computer programs and mobile applications to determine a shortest path between two vertices. A particular known example is in determining the shortest path for driving from a point of departure or a source to a destination within minimal time. Examples of programs and applications that can determine such shortest paths include Google® Maps, Waze, MapQuest®, Sygic® and the like. Reference is now made to FIGS. 2A-2F, which are schematic illustrations of a weighted flow network modeling a shortest path between a point of departure and a destination over a plurality of iterations, generally referenced 40-40"", as is known in the prior art. In general, similar reference numerals are used throughout FIGS. 2A-2F to show similar elements in each of those figures, with an apostrophe symbol appended to a reference numeral to differentiate similar elements in different figures. Each of FIGS. 2A-2F shows the determination of a shortest path between a vertex A, representing a point of departure or source and a vertex B, representing a destination, at different iterations of a SP algorithm. To keep the figures from being too cluttered, a simplified weighted flow network between vertices A and B is shown including only three vertices and six edges, it being understood that real world representations of such problems usually include tens if not hundreds of vertices and edges.

Reference is now made to FIG. 2A, which includes a point of departure vertex 42, shown as a vertex A and a destination vertex 44, shown as a vertex B. Vertices 42 and 44 represent two different cities, such as Tel-Aviv and Jerusalem. FIG. 2A models the shortest path problem of a driver wanting to leave Tel-Aviv and arrive in Jerusalem in minimal time. Vertex A and vertex B are connected via a plurality of intermediate vertices $46_A$, $46_B$ and $46_C$ and edges $48_A$, $48_B$, $48_C$, $48_D$, $48_E$ and $48_F$. Vertices $46_A$, $46_B$ and $46_C$ are shown in FIG. 2A as vertices '1', '2' and '3'. Edge $48_A$ connects vertex A to vertex 1, edge 48$_B$ connects vertex A to vertex 3, edge 48$_C$ connects vertex 1 to vertex 2, edge 48$_D$ connects vertex 3 to vertex 2, edge 48$_E$ connects vertex 3 to vertex B and edge 48$_F$ connects vertex 2 to vertex B. Each of edges 48$_A$-48$_F$ represents major roads and highways between Tel-Aviv and Jerusalem, with vertices 46$_A$, 46$_B$ and 46$_C$ representing major intersections of those roads and highways. As shown in FIG. 2A, each edge has an associated weight, the weight representing the time required to travel on a particular road or highway at a given time. The time required can be the distance between two vertices divided by the average speed a car can travel between two vertices based on the traffic and congestion of that particular road or highway at a given time. Edge 48$_A$ has a weight of 12 minutes (abbreviated min in the figures), edge 48$_B$ has a weight of 32 minutes, edge 48$_C$ has a weight of 18 minutes, edge 48$_D$ has a weight of 20 minutes, edge 48$_E$ has a weight of 41 minutes and edge 48$_F$ has a weight of 15 minutes. An iteration marker 52, using the variable 'k', is used to show the iteration during which a known SP algorithm is used to determine the shortest path between Tel-Aviv and Jerusalem. Since the weights shown in FIG. 2A represent the amount of time required for a car to travel down a road or highway, the shortest path between Tel-Aviv and Jerusalem is represented as the path through which the car travels at the minimal amount of time. Phrased differently, this is equivalent to the shortest travel time between the two cities.

During a first iteration, where k=1, a shortest path 50, labeled as 'SP', is shown. Shortest path 50 is from vertex A to vertex 1, vertex 1 to vertex 2 and vertex 2 to vertex B. FIG. 2A may graphically represent a user query submitted to a program or application such as Waze or Sygic® requesting how to drive from Tel-Aviv to Jerusalem in the shortest amount of time. Reference is now made to FIG. 2B, which shows the same weighted flow network as in FIG. 2A, except with an iteration marker 52' now showing k=2. FIG. 2B may thus graphically represent another user query to the same program or application, submitted soon after the user query of FIG. 2A was submitted, again requesting how to drive from Tel-Aviv to Jerusalem in the shortest amount of time. As shown, the weights of edges 48'$_A$-48'$_F$ are identical to the weights of edges 48A-48F (FIG. 2A), as perhaps not much time has elapsed between the user query of FIG. 2A and the user query of FIG. 2B. As shown a shortest path 50' is shown, from vertex A to vertex 1, vertex 1 to vertex 2 and vertex 2 to vertex B. Therefore the user who submitted the query as graphically shown in FIG. 2B would take the same route as the user who submitted the query as graphically shown in FIG. 2A. It is noted that the weights in FIGS. 2A and 2B may be provided to the algorithm determining the shortest path between vertex A and vertex B by another program or application (not shown).

Reference is now made to FIG. 2C, which shows the same weighted flow network as in FIGS. 2A and 2B, except with an iteration marker 52" now showing k=3. FIG. 2C may thus graphically represent a further user query to the same program or application, submitted soon after the user queries of FIGS. 2A and 2B were submitted, again requesting how to drive from Tel-Aviv to Jerusalem in the shortest amount of time. As shown in FIG. 2C, the weights of some of the edges in a weighted flow network 40" have changed as compared to FIGS. 2A and 2B. The weights of edges 48"$_B$, 48"$_C$, 48"$_D$, 48"$_E$ and 48"$_F$ have all changed as traffic flow is a dynamic matter and is influenced by the choices drivers make in terms of how to drive from their respective points of departure to their respective destinations. The weight of edge 48"$_B$ is now 30 minutes as compared to edge 48'$_B$ (FIG. 2B) which was 32 minutes. The weight of edge 48"$_C$ is now 20 minutes as compared to edge 48'$_C$ (FIG. 2B) which was 18 minutes. The weight of edge 48"$_D$ is now 26 minutes as compared to edge 48'$_D$ (FIG. 2B) which was 20 minutes. The weight of edge 48"$_E$ is now 36 minutes as compared to edge 48'$_E$ (FIG. 2B) which was 41 minutes. The weight of edge 48"$_F$ is now 18 minutes as compared to edge 48'$_F$ (FIG. 2B) which was 15 minutes. As shown, the weights of some of the edges in FIG. 2C have increased as compared to FIGS. 2A and 2B, such as edges 48"$_B$ and 48"$_E$, whereas the weights of other edges have decreased as compared to FIGS. 2A and 2B, such as edges 48"$_C$, 48"$_D$ and 48"$_F$. In FIG. 2C, a shortest path 50" is shown, going from vertex A to vertex 1, vertex 1 to vertex 2 and vertex 2 to vertex B. Even though the weights of the edges have changed, the determined shortest path in the query illustrated in FIG. 2C is the same as the determined shortest path in FIGS. 2A and 2B.

Reference is now made to FIG. 2D, which shows the same weighted flow network as in FIGS. 2A-2C, except with an iteration marker 52''' now showing k=1000. FIG. 2D may thus graphically represent another user query to the same program or application, submitted significantly after the user queries of FIGS. 2A-2C were submitted, again requesting how to drive from Tel-Aviv to Jerusalem in the shortest amount of time. As shown in FIG. 2D, all the weights of the edges in a weighted flow network 40''' have changed as compared to FIGS. 2A-2C. In addition, a shortest path 50''' determined is now completely different than the determined shortest paths in FIGS. 2A-2C. Shortest path 50''' is from vertex A to vertex 3 and from vertex 3 to vertex B.

Reference is now made to FIG. 2E, which shows the same weighted flow network as in FIGS. 2A-2D, except with an iteration marker 52"" now showing k=2500. FIG. 2E may thus graphically represent another user query to the same program or application, submitted significantly after the user query of FIG. 2D was submitted, again requesting how to drive from Tel-Aviv to Jerusalem in the shortest amount of time. As shown in FIG. 2E, all the weights of the edges in a weighted flow network 40"" have changed again as compared to FIGS. 2A-2D. In addition, a shortest path 50"" determined is now completely different than the determined shortest path in FIG. 2D however it is the same shortest path as determined in FIGS. 2A-2C. Shortest path 50"" is from vertex A to vertex 1, vertex 1 to vertex 2 and vertex 2 to vertex B.

Reference is now made to FIG. 2F, which shows the same weighted flow network as in FIGS. 2A-2E, except with an iteration marker 52''''' now showing k=5000. FIG. 2F may thus graphically represent another user query to the same program or application, again submitted significantly after the user query of FIG. 2E was submitted, again requesting how to drive from Tel-Aviv to Jerusalem in the shortest amount of time. As shown in FIG. 2F, all the weights of the edges in a weighted flow network 40''''' have changed again as compared to FIGS. 2A-2E. In addition, a shortest path 50''''' determined is now completely different than the determined shortest paths of any of FIGS. 2A-2E. Shortest path 50''''' is from vertex A to vertex 3, vertex 3 to vertex 2 and vertex 2 to vertex B.

As shown above in FIGS. 2A-2F, according to the prior art, each time a shortest path is determined in a weighted flow network, a determination is made based on the current and most up-to-date weights of each edge in the weighted flow network. Many factors can influence the weight of an edge, such as the time of day, the number of drivers on a particular road, the familiarity of a particular road to a given driver and the likelihood that the driver will drive on that particular road, and the like. In a dynamic weighed flow network, such as shown above in FIGS. 2A-2F, the weights dynamically change over time and thus the determined shortest path from vertex A to vertex B will change over time. As shown above, a first user (k=1) of an application such as Waze or Sygic® may be directed to take shortest path 50 (FIG. 2A) whereas user five thousand (k=5000) of such programs may be directed to take shortest path 50'''' (FIG. 2F) which is very different than shortest path 50. Thus each user of such programs is given an optimized shortest path for that user at a given time period.

Looking over time, from k=1 until k=5000, the load on the weighted flow networks of FIGS. 2A-2F constantly changes and fluctuates. In general, the load represents how many things, goods or objects can travel at any given time in a flow network as well as through which paths in the flow network they can travel down. The load (not shown) in FIGS. 2A-2F thus represents how many cars can travel on the various possible paths between vertices A and B. Loads can be classified on a spectrum of being balanced on one side and unbalanced on the other. Unbalanced loads in flow networks occur when certain paths carry a substantial portion of the total load in the flow network whereas other paths carry a minimal portion of the total load in the flow network. Unbalanced loads in a weighted flow network can thus be seen over time when the shortest path from a start vertex to an end vertex continually changes, as shown above in FIGS. 2C-2F. Balanced loads in flow networks occur when the total flow is substantially evenly spread out and balanced between the various possible paths from a start vertex to an end vertex. As shown above, the decisions which users of an SP algorithm make in weighted flow networks tend to generate unbalanced loads in those weighted flow networks. Since users usually choose the shortest path at a given moment, such path decisions eventually cause an imbalance in the weighted flow network.

Methods and systems for balancing the load in weighted flow networks are known in the art. US Patent Application Publication No. 2014/0269268 to Rao, entitled "Providing network-wide enhanced load balancing" is directed to a method and apparatus for providing network-wide enhanced load balancing. In an embodiment, a first message comprising a first value and an address is generated. The first message is transmitted to a first node via a first communication link. A second message comprising a second value and the address is generated. The first and second values are unequal. The second message is transmitted to the first node via a second communication link. Packets are received, wherein each of the packets comprises the address. A first percentage of the packets are forwarded to a first device via the first communication link, wherein the first percentage is proportional to the first value. A second percentage of the packets are forwarded to a second device via the second communication link, wherein the second percentage is proportional to the second value.

US Patent Application No. 2014/0280969 to Wood et al., entitled "Load balancer and related techniques" is directed to a system for balancing network traffic among virtual machines. The system includes a first virtual machine executed by a first physical server connected to a physical network and a second virtual machine executed by a second physical server connected to the physical network. A gateway device is configured to route network traffic through the physical network to and from the first and second virtual machines. A load balancer module is executed by the gateway device. The load balancer module is configured to at least partially decode the network traffic to identify a destination address of the network traffic and to determine if the destination address is the address of a load-balanced virtual machine. The load balancer module is also configured to route the network traffic to a destination virtual machine according to a load-balancing scheme if the destination address is the address of a load-balanced virtual machine.

US Patent Application Publication No. 2014/0379938 to Bosch et al., entitled "Hierarchical load balancing in a network environment" is directed to a method for load balancing in a network environment. The method includes the operations of receiving a packet from a first stage load-balancer in a network environment, where the packet is forwarded from the first stage load-balancer to one of a plurality of second stage load-balancers in the network according to a hash based forwarding scheme, and routing the packet from the second stage load-balancer to one of a plurality of servers in the network according to a per-session routing scheme. The per-session routing scheme includes retrieving a session routing state from a distributed hash table in the network. The hash based forwarding scheme can include equal cost multi path routing. The session routing state can include an association between a next hop for the packet and the packet's 5-tuple representing a session to which the packet belongs.

SUMMARY OF THE PRESENT DISCLOSED TECHNIQUE

It is an object of the disclosed technique to provide a novel method and system for globally optimizing and balancing the load in networks. In accordance with the disclosed technique, there is thus provided a method for globally optimizing a weighted flow network. The method comprises the procedures of collecting a plurality of metrics in the network, receiving a plurality of route requests from a first node to a second node in the network and determining K best routes out of N possible routes from the first node to the second node according to the metrics. The method also comprises the procedures of balancing a load in the network by distributing the route requests over the K best routes from the first node to the second node and updating the metrics.

In accordance with another embodiment of the disclosed technique, there is thus provided an apparatus for globally optimizing a weighted flow network. The apparatus comprises a metric collector, a route request receiver and a processor. The metric collector is for collecting a plurality of metrics in the network. The route request receiver is for receiving a plurality of route requests from a first node to a second node in the network. The processor is for determining K best routes out of N possible routes from the first node to the second node according to the metrics collected by the metric collector. The processor balances a load in the network by distributing the route requests over the K best routes from the first node to the second node. The metric collector also collects an updated plurality of metrics.

BRIEF DESCRIPTION OF THE DRAWINGS

The disclosed technique will be understood and appreciated more fully from the following detailed description taken in conjunction with the drawings in which:

FIG. 1 is a schematic illustration of a weighted flow network, as is known in the prior art;

FIGS. 2A-2F are schematic illustrations of a weighted flow network modeling a shortest path between a point of departure and a destination over a plurality of iterations, as is known in the prior art;

DETAILED DESCRIPTION OF THE EMBODIMENTS

Figure 2C:
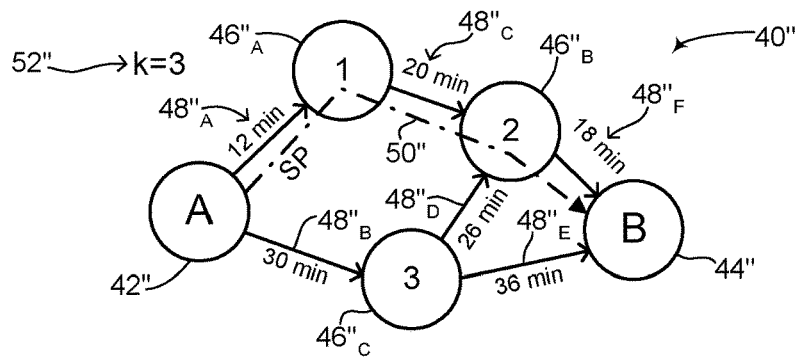

The disclosed technique overcomes the disadvantages of the prior art by providing novel methods and systems for load balancing weighted flow networks thereby globally optimizing such weighted flow networks. The novel methods and systems can be used for globally optimizing sets of data that can be formulated and represented as weighted flow networks and can be applied to physical flow networks, such as plumbing systems and electrical grids as well as to virtual flow networks, such as transferring data over the Internet and traffic optimizing applications such as Waze and Sygic®. The disclosed technique also applies to networks in which the paths over which data is transferred in a flow network are controlled. According to the disclosed technique, in a weighted flow network, a plurality of shortest paths, or best paths, is determined from a start node to an end node. Based on a plurality of metrics, user requests of the network for moving goods, objects and data can be routed such that the network is load balanced and thus optimized globally. According to the disclosed technique, by distributing user requests for the transfer of data over a network over a determined number of best routes, the load in the network can be balanced and use of the network can be optimized globally. According to the disclosed technique, the selection of a given path according to a user request for goods, objects and data for a route through the network is based on the effect the use of the given path will have on the load balance of the entire network. By taking into account that effect, selected routes in response to user requests for transferring goods, objects and data can be optimally determined to maintain the network in a load balanced state. It is noted that in some methods for balancing weighted flow networks, such as a traffic optimization application, the method merely gives a recommendation to a user such as a driver, which a given driver might not use. Whereas the disclosed technique can be used in such weighted flow networks, the disclosed technique can guarantee a more balanced flow network when used in a flow network where control can be exerted over how data is transferred through the weighted flow network, such as by deciding which routes are used, how much data is sent per route and what kind of data is sent over which route. According to one embodiment of the disclosed technique, balancing a weighted flow network is achieved, as described below, by controlling how data is transferred through the network.

According to the disclosed technique a utilitarian approach is taken with respect to best routes, wherein the best paths for a plurality of requests to transfer goods, objects and data is returned as the answer to a plurality of requests for a best route. This is different than the prior art in which the response to a request for a best path returns a local best result for transferring the object, good or data without any consideration for other users or how the returned request will affect the transfer of the object, good or data as time progresses.

The disclosed technique is described herein using the example of a traffic optimization application, as mentioned above, with further examples listed below as well. However it is understood by the worker skilled in the art that the disclosed technique applies to any weighted flow network and is not limited to the examples presented below, in particular to the example presented in FIGS. 4A-4D. In addition, it is noted that in the case of a traffic optimization application, forecasting and predicting how a flow network will distribute a load and how it can be balanced is difficult and possibly inaccurate since in such an example, individual users of the application do not need to follow the recommendations of the application and many individuals using the flow network (e.g., the flow network of roads and streets) might not even use the application to get a recommendation. As mentioned above, the disclosed technique can be used in such a flow network. In an embodiment of the disclosed technique, forecasting and prediction of how a flow network will distribute a load and how to keep the flow network more balanced is easier and more accurate since how data and traffic will flow through the flow network is controlled. Such a flow network might be a proprietary network, modeled as a weighted data network or a weighted traffic network, such that any data which is sent though the proprietary network is subject to the decisions of the proprietor of the flow network. According to this embodiment of the disclosed technique, in such a proprietary network, the proprietor (which may be embodied as a computer program, application, apparatus or algorithm) can decide not only where data should be sent via the flow network but also how data is sent via the flow network. Such control cannot completely guarantee forecasting and prediction of the distribution of the load in the flow network since the proprietary network operates on the backbone of the Internet of which no one has total control. There will also be users who might upset the balance of the flow network on the whole since they use the Internet but have not asked the proprietor how data should flow through the Internet, even if some of the data flows through nodes shared and used by the proprietary network. Nevertheless, by controlling how most data is distributed and moved through the proprietary network, forecasting and predicting the distribution and load balance of the proprietary network can be significantly increased in accuracy.

According to the disclosed technique, the term 'weighted flow network' can refer to any data set that can be represented as a weighted directed graph, with those terms (i.e., 'flow network' and 'directed graph') used interchangeably throughout this document. As described above, the terms 'vertex' or 'node' represents any junction point in such networks, with the term 'edge' representing a connection between vertices or nodes. The terms 'vertex', 'node' and 'edge' are all context dependent, as is known to the worker skilled in the art, and their interpretation depends on the data set being modeled as a directed graph. For example, in the case of traffic optimization applications, nodes represent intersections, neighborhoods, cities, highway exits and the like, whereas edges represent roads, routes, streets, highways and the like. In the case of data transfer optimization, nodes represent either physical or virtual servers, routers, proxies and the like, whereas edges represent either physical or virtual network connections, either wired or wireless, between those nodes. It is noted that nodes and edges as described above can represent be physical entities as well as virtual entities. For example, in the case of data transfer optimization, nodes could be physical servers with edges representing physical network connections or nodes could be virtual servers with edges representing virtual network connections. The term 'weight' is used interchangeably throughout this document with the term 'metric' and describes a cost, price, required payment, expense and the like for using a particular edge for transferring an object or good. Using the examples above, in the case of traffic optimization applications, a metric associated with each edge might include a toll fee if certain roads require tolls, a safety indicator if use of a road involves driving through a dangerous area, a distance of a particular road between two intersections, an average speed a car can travel on a road and the like. In the case of data transfer optimization, a metric associated with each edge might include a capacity of data transfer, such as how many bits per second can be transferred over a connection, latency, which is a metric that represents how long it takes to go from one node to another node, round trip time, which is a metric that represents how long it takes to go from a first node to a second node and then back to the first node, an actual monetary cost for using a particular connection, an indication of how loaded a particular connection is, thus indicating how fast/slow a connection is and the like. It is also noted, according to the disclosed technique, that an edge in a weighted flow network might include a plurality of metrics, weights or derived metrics. In addition, the plurality of metrics or weights might be expressed as a function, giving rise to a single numerical indicator representing the plurality of metrics. It is furthermore noted that the terms 'route' and 'path' are used interchangeably.

Figure 3A:
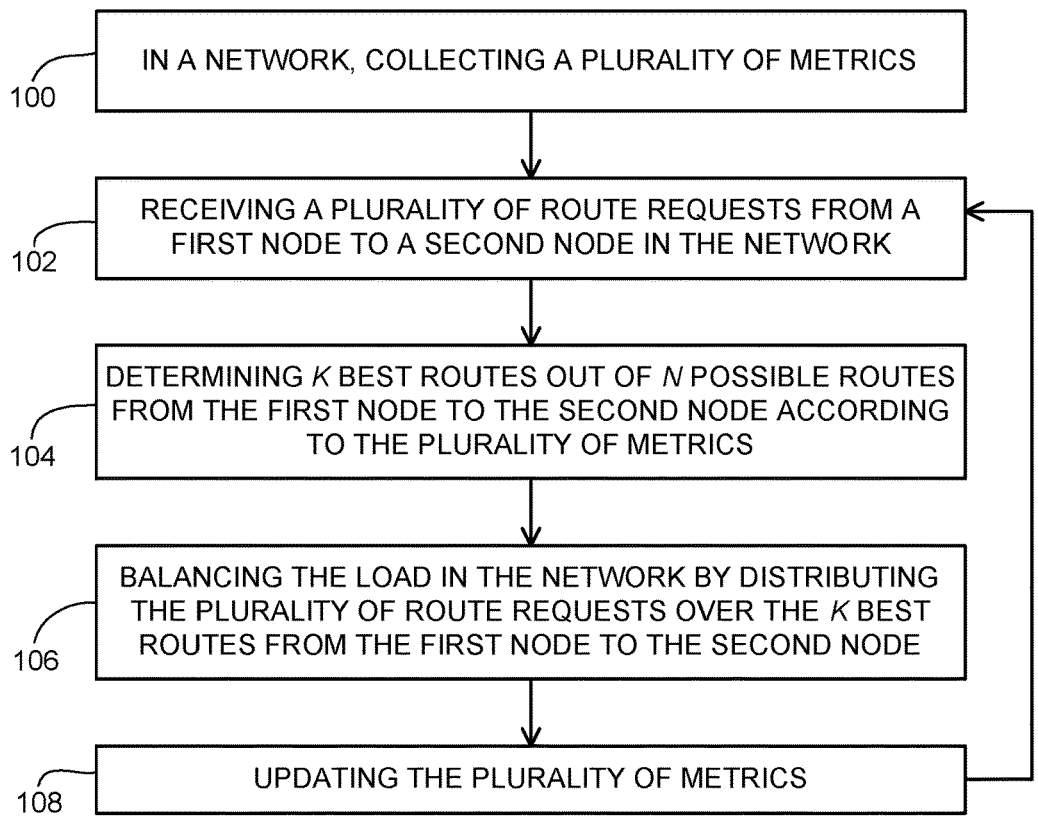
FIG. 3A is a schematic illustration of a method for globally optimizing a weighted flow network, operative in accordance with an embodiment of the disclosed technique.

The disclosed technique is described below in FIGS. 3A and 3B as a method, with an example of the method shown graphically in FIGS. 4A-4D. First the procedures of the method are described and then the method of the disclosed technique is described using the example shown in FIGS. 4A-4D. Reference is now made to FIG. 3A, which is a schematic illustration of a method for globally optimizing a weighted flow network, operative in accordance with an embodiment of the disclosed technique. In a procedure 100, a plurality of metrics is collected for a given network. As mentioned above, the network can be any data set that can be modeled as a weighted directed graph and can be an information network such as the Internet, a company's intranet and a proprietary network, such as a telecommunication company's 4G LTE network or a physical network such as a road network, a plumbing network or an electrical wire network. In procedure 100, a plurality of metrics or weights for a given network is collected. In the case of the disclosed technique being embodied as an apparatus, the plurality of metrics or weights can be collected by a metric collector. The metric collector can be embodied as an application, program, processor, circuit and the like, for collecting metrics for a given network. The plurality of metrics, as mentioned above, is context dependent on the definition of the network, and each edge in the network might include more than one metric. For example, in the case of a road network, each edge might include four metrics, such as the distance of the road (i.e., edge) between two intersections (i.e., vertices), the associated toll cost of the road as well as the current average travel speed on the road and the time required to travel on a particular section of the road (i.e., latency). The metrics may be stored in a data structure, such as a hash table, a database, a linked list, an array and the like. At the end of procedure 100, the network can be properly modeled as a weighted flow network, as each edge has an associated metric. A shortest path optimization can now be applied to the network. It is also noted that the metrics referred to in procedure 100 can include known metrics used by software applications, networking routers and websites for determining analytics regarding the use of such software applications, networking routers and websites. Using the example of a road network, in procedure 100, a plurality of metrics is received about the road network, including metrics about each road, street and highway in the road network.

In a procedure 102, a plurality of route requests are received in the network, for using the network to go from a first node to a second node. The first node represents a start node, initial position, start, point of departure, source and the like. The second node represents an end node, finish position, end, destination and the like. The network may be modeled digitally, such as on a computer or a server, and thus in procedure 102, an application with access to the digital representation of the network receives a plurality of requests for finding a route from the first node to the second node. In the case of the disclosed technique being embodied as an apparatus, the plurality of requests can be received by a route request receiver. The route request receiver can be embodied as a program, application, circuit, processor and the like having access to the digital representation of the network. In general, the first node can also be referred to as the source or source node, and the second node can be referred to as a destination or destination node. It is furthermore noted that route requests in such networks generally refer to optimized routes or best routes. As mentioned in the background section, optimized routes or best routes are also referred to as shortest paths and represent the path with the smallest weight. It is noted that in the case of the network also being a directed acyclic graph (also referred as a DAG), a best route can refer to the path with the largest weight. In general in optimization problems, best paths are always phrased as minimization problems or shortest path problems since optimization problems phrased as largest path problems are considered NP-hard and are currently not solvable. Using the example of a road network as mentioned above, in procedure 102, a plurality of user requests for moving objects or goods are received for travelling from a source node, such as a start city, to a destination node, such as a finish city.

In a procedure 104, using the plurality of metrics collected in procedure 100, K best routes out of N possible routes from the first (i.e., source) node to the second (i.e., destination) node are determined. In general, the term 'best route' refers to an optimized route, which may be the route with the smallest weight, or largest weight in the case of the weighted flow network being a DAG. In procedure 104, $K \leq N$ where K is a natural number from 1 to N. As mentioned above, a network might have a plurality of routes from a source node to a destination node. Simple SP (shortest path) algorithms can determine the path with the sum of weights minimized. More complex SP algorithms can determine the K paths with the sum of weights minimized. For example $P_1$ might be the path with the shortest path from source to destination with the sum of weights minimized, $P_2$ might be the path with the second shortest path from source to destination with the sum of weights minimized, $P_3$ might be the path with the third shortest path from source to destination with the sum of weights minimized and so on to the $K^{th}$ shortest path. In procedure 104, a complex SP algorithm, such as a K-shortest path routing algorithm can be used. K-shortest path routing algorithms are known in the art and include an extension to Dijkstra's algorithm, an extension to the Bellman Ford algorithm and Yen's algorithm for K-shortest loopless paths. In procedure 104, using the example mentioned above, K best paths are determined from the source city to the destination city. In the case of the disclosed technique being embodied as an apparatus, procedure 104 can be performed by a processor for determining the K best paths.

In a procedure 106, the load in the network is balanced by distributing the plurality of route requests over the K best routes from the first (i.e., source) node to the second (i.e., destination) node. As mentioned above, the load in a network represents the amount of goods, objects or data being carried in the network. In this procedure, the plurality of route requests from procedure 102 are distributed over the K best routes. By distributing the route requests over the determined K best routes, the load in the network is balanced and use of the network is optimized globally. As mentioned above, in the case of a proprietary network, such a distribution can be achieved with significant predictability since how route requests are actually distributed is controlled by the proprietary network. The sub-procedures for distributing the plurality of route requests over the K best routes are described below in further detail in FIG. 3B. Distributing the load in the network means that not every user request for moving goods and objects is returned with a response to use the route with the shortest path or having its metric minimized. Some of the user requests for moving goods and objects are answered with a response to use the route with the shortest path, however some of the user requests for moving goods and objects are answered with a response to use another one of the K best routes determined in procedure 104. As explained below, this procedure enables the network to remain globally balanced. In the case of the disclosed technique being embodied as an apparatus, procedure 106 can be performed by a processor for balancing the load in the network by distributing the plurality of route requests over the K best routes from the first node to the second node.

Using the example mentioned above, if five hundred (500) user requests for moving goods and objects are made for determining the shortest path or best route from the source city to the destination city, in procedure 104, K best routes are determined, where K may be in this example 10. In procedure 106, the five hundred user requests are distributed over the K best routes, for example as follows. One hundred and fifty (150) user requests may be answered by returning a response that they take the best route, one hundred (100) user requests may be answered by returning a response that they take the second best route, one hundred (100) user requests may be answered by returning a response that they take the third best route, seventy five (75) user requests may be answered by returning a response that they take the fourth best route, seventy (70) user requests may be answered by returning a response that they take the fifth best route and five (5) user requests may be answered by returning a response that they take the sixth best route.

Figure 2D:
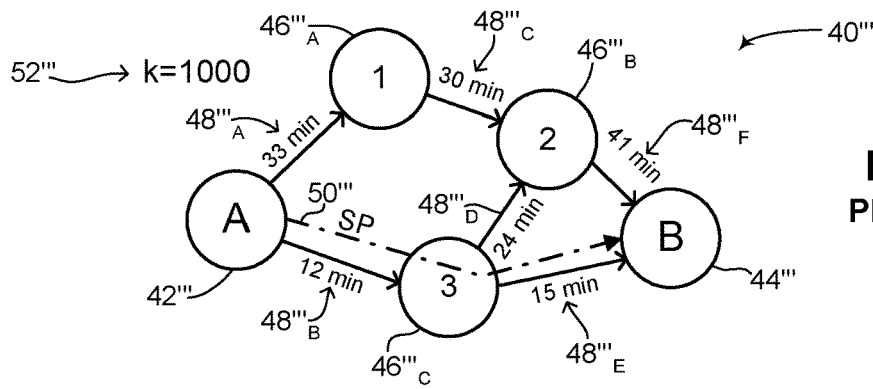
Figure 2E:
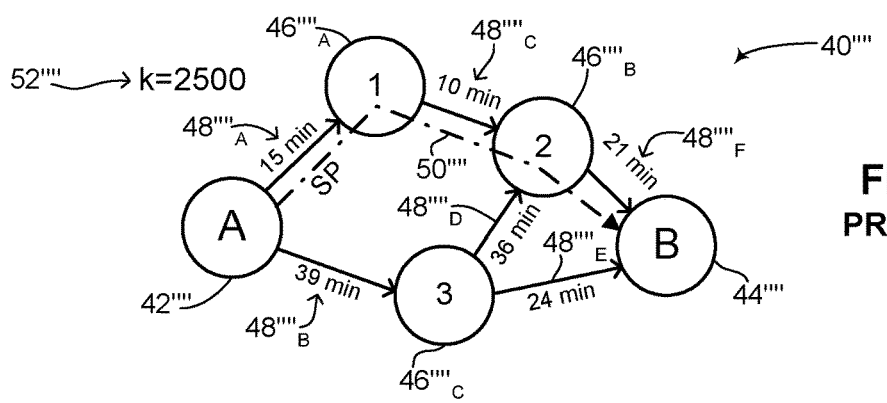
Figure 2F:
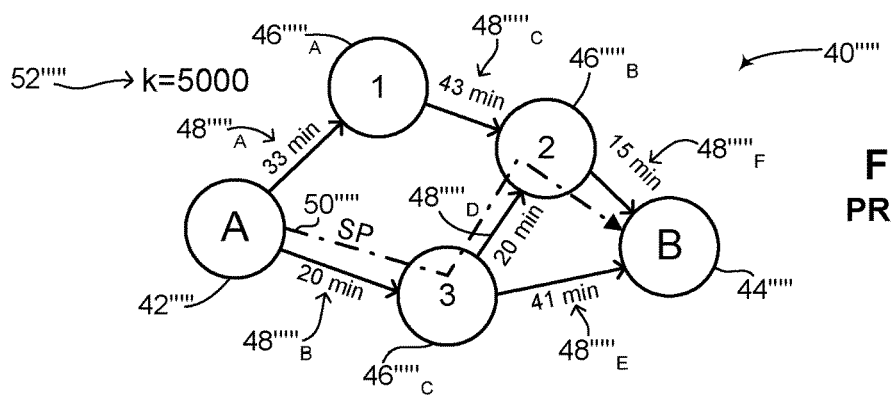

In the prior art, as described above in FIGS. 2A-2F, a user request for a best route in a weighted flow network for moving objects, data or goods is returned with a response to use the best route. The determined best route for a given object, good or data is the best route to use in a weighted flow network at a particular time given particular metrics. According to the prior art, the local best route for moving a good, object or data is returned as a response to the user query for the best route. According to the prior art, the returned best route does not take into account the effect that such a response will have on the network over time as more and more requests for moving an object, good or data are returned the same best route to take. This occurs since the returned best route is based on up-to-date metrics at a given moment. For example, as shown above in FIGS. 2A-2C, the shortest path from vertex A to vertex B is via vertices 1 and 2. This remains true for the first three driver requests for a best route. However the decision of a driver to take a particular route requires time before that decision has an effect of the metrics of the network. If a network repeatedly returns the same best route to a plurality of driver requests, eventually that best route will cease to be the best route, as too many drivers of that best route will eventually change the metrics of the determined route. At that point another route will become the best route and driver requests will be responded to by taking that other route. For example, as shown above in FIG. 2D, by the one thousandth request for a shortest path between vertex A and vertex B, the shortest path has changed to a route via vertex 3. However, as above, repeated responses to take that other route will eventually change the metrics of the network and cause that other route to cease being the best route. For example, as shown above in FIG. 2E, by the two thousand and five hundredth request the shortest path between vertex A and vertex B has changed again and is similar to the original shortest path determined for the first driver request in FIG. 2A. As shown above in FIG. 2F, the shortest path will continue to change drastically as a plurality of drivers use a determined best path until the determined path ceases to be the best path. According to the prior art, this process of shifting the best route occurs continually as the determination of the best route at a given moment eventually causes that best route to become too loaded with goods, objects, drivers and the like. As shown above in FIGS. 2A-2F, this approach effectively moves the load around the network, benefitting certain drivers and inconveniencing other drivers. As mentioned above, this causes the network load to be generally unbalanced by preferencing local optimization for user requests rather than global optimization of the entire weighted flow network as disclosed by the disclosed technique. In addition, prior art systems and methods in the field of the disclosed technique in general prioritize an individual user request for moving an object, good or data at a given time, i.e., what is best for a given data request at a given moment. According to the disclosed technique, an individual data request is not prioritized. What is prioritized by the disclosed technique is the network, service provider or network infrastructure which controls how data, objects and goods are moved through the network. In this respect, the disclosed technique enables a network to be globally optimized and for the global optimization of the network to substantially remain balanced over time. In addition, in the case of a weighted data network where control of the movement of data through the weighted data network is controlled, according to the disclosed technique, a user request for transferring data from a source node to a destination node is answered by forcing the data to be transferred via the route suggested by the disclosed technique.

According to the disclosed technique, in particular as described above in procedure 106, the general unbalanced nature of weighted flow networks in the case of shortest path algorithms is avoided. This is due to the distribution of requests for a best path for transferring goods, objects and data over a plurality of best routes, thereby spreading the load over a plurality of best routes in the network. According to the prior art, a greedy approach is taken with respect to best routes, wherein the best path at a given moment is returned as the answer to a request for a best route. Such a response gives a local best result for transferring the object, good or data without any consideration for other users or how the returned request will affect the transfer of the object, good or data as time progresses. According to the disclosed technique, a utilitarian approach is taken with respect to best routes, wherein the best paths for a plurality of requests to transfer goods, objects and data is returned as the answer to a plurality of requests for a best route. Such a response gives a global best result for the entire network such that the highest number of requests for transferring goods, objects and data receives a best path which should remain a best path as time progresses since the choice of determined best paths takes into consideration the effect of a plurality of objects, goods and data using only one single best path. By distributing the load over a plurality of best paths in the network, the overall load of the network can be balanced and can remain balanced, thus benefitting the highest number of goods, objects, cars, traffic and data as time progresses. Said otherwise, the prior art attempts to move a single object, good or data through a weighted flow network as fast as possible, whereas according to the disclosed technique, an attempt is made to move as many objects, goods and data as possible through a weighted flow network as fast as possible.

In a procedure 108, the metrics of the network are updated. In general, the metrics of the network are continuously and constantly updated such that at any given time, a plurality of K best routes can be determined based on up-to-date metrics. The updating of the metrics of the network helps to ensure that the weighted flow network remains balanced and globally optimized in terms of its load. In the case of the disclosed technique being embodied as an apparatus, the metric collector collects an updated plurality of metrics. As shown, after procedure 108, the procedure returns to procedure 102, wherein another plurality of route requests may be received for moving goods, objects, data and the like from a source node to a destination node.

It is noted that procedures 102-108 have been presented as relating to a single request for a best route from a first node to a second node. However, as understood by the worker skilled in the art, the disclosed technique does not relate to merely a single request for a best route in a weighted flow network. The method presented in procedures 102-108 can be used iteratively and/or recursively to determine the best sub-routes in a sub-network of the weighted flow network, for example from a first node after the source node to a second node before the destination node. If hundreds of nodes exist between a source node and a destination node in a weighted flow network, then according to the disclosed technique, the best routes from the source node to the destination node may be determined using a divide-and-conquer algorithm or technique wherein the weighted flow network is divided into a plurality of sub-networks, where each sub-network may have its respective source node and destination node. The method of the disclosed technique as shown in FIGS. 3A and 3B can then be used to determine a plurality of best routes for each sub-network such that each sub-network is globally optimized and load balanced and thereby the entire weighted flow network is also globally optimized and also load balanced.

Figure 3B:
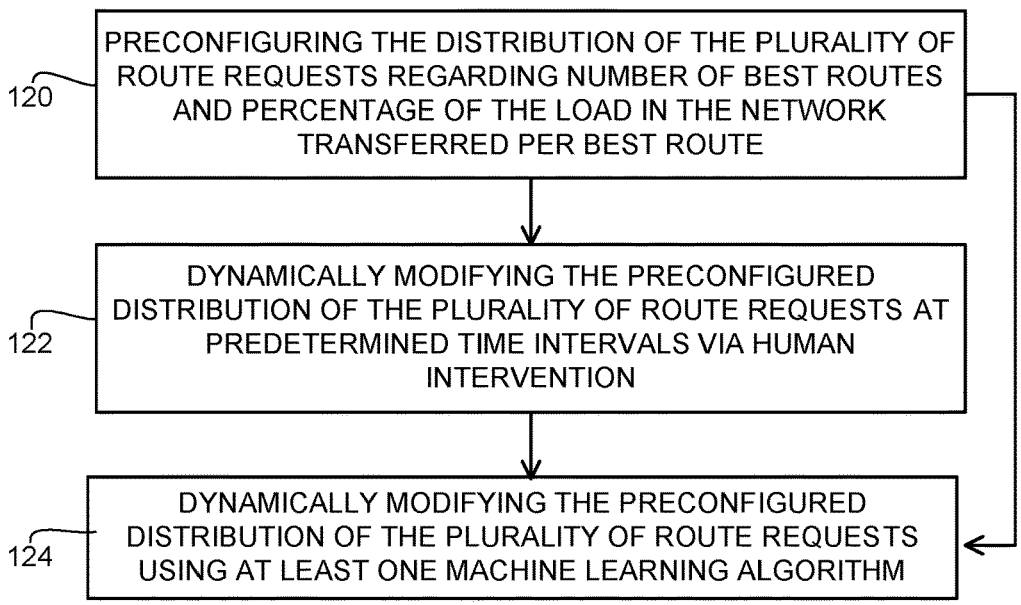
FIG. 3B is a schematic illustration of some of the sub-procedures of the method of FIG. 3A, operative in accordance with another embodiment of the disclosed technique.

Reference is now made to FIG. 3B, which is a schematic illustration of some of the sub-procedures of the method of FIG. 3A, operative in accordance with another embodiment of the disclosed technique. In particular, FIG. 3B shows sub-procedures to procedure 106 (FIG. 3A) for balancing the load in the network. In a sub-procedure 120, the distribution of the plurality of route requests is preconfigured. In particular this includes preconfiguring the number of K best routes determined in procedure 104 (FIG. 3A) as well as the percentage of the load in the network transferred per best route. For example, in this sub-procedure four best routes might be preconfigured, with the following load percentage distribution preconfigured for each of the four best routes. Each best route is thus assigned a particular percentage of how much of the load in the network it is to handle. For a given request for moving objects, goods or data from a source node to a destination node, four best routes are determined in procedure 104. In procedure 106, the given request is balanced according to the following percentage split. The best route will handle 70% of the objects, goods or data, the second best route will handle 15% of the objects, goods or data, the third best route will handle 10% of the objects, goods or data and the fourth best route will handle 5% of the objects, goods or data. In this sub-procedure, the number of determined best routes as well as the percentage split per determined best route is hardwired and permanent. The numbers given above are merely examples. By preconfiguring how the flow network is to be balanced, a constant and stationary sub-procedure is achieved.

In a sub-procedure 122, the preconfigured distribution of the plurality of route requests as set in sub-procedure 120 can be modified dynamically via human intervention at predetermined time intervals or by an algorithm. The predetermined time intervals may be every hour, every 24-hours, every week, every month and the like. At each predetermined time interval, the number of K best routes determined in procedure 104 (FIG. 3A) can be changed as well as the percentage split of how many objects, goods and data are transferred over the K best routes. Using the example given in sub-procedure 120, after a week, in sub-procedure 122 the number of best routes determined might be changed from four to three with the percentage split changed such that the best route handles 85% of the transfer of goods, objects and data, the second best route handles 10% of the transfer of goods, objects and data and the third best route handles 5% of the transfer of goods, objects and data.

In this sub-procedure, the load balancing done in the weighted flow network in procedure 106 (FIG. 3A) is based on data and metrics gathered about the weighted flow network since the previous predetermined time interval. The data and the metrics can be used by a human, such as a worker skilled in the art, to determine how balanced or unbalanced the load on the weighted flow network has been given the previous configuration of how many best routes are determined and how the percentages of routing goods, objects and data over those best routes is split. The worker skilled in the art can then modify the set number of best routes determined as well as the percentage split in an attempt to better balance the load and globally optimize the weighted flow network. As mentioned above, the numbers given above are merely examples. By dynamically modifying the preconfigured number of best routes determined and the percentage split for balancing a weighted flow network, a changing and dynamic sub-procedure is achieved. As shown, sub-procedure 122 is generally executed after sub-procedure 120 is executed, once a number of best routes and a percentage split have already been established. It is noted that sub-procedure 122 is optional and does not need to follow sub-procedure 120. Each one of sub-procedures 120 and 122 can be used as separate sub-procedures for executing procedure 106. In another embodiment, first sub-procedure 120 is executed and after a first predetermined time interval, sub-procedure 122 is iteratively executed each predetermined time interval in order to maintain the balanced load and global optimization of the weighted flow network.

In a sub-procedure 124, the preconfigured distribution of the plurality of route requests are dynamically modified using at least one machine learning algorithm. In general sub-procedure 124 is executed after sub-procedure 120 is executed. In another embodiment, sub-procedure 124 is executed after sub-procedure 122 has been executed. For example, sub-procedure 122 may be executed once every week for a year until a large data set is generated at which point sub-procedure 124 can then be executed. In a further embodiment, sub-procedure 124 is also optional like sub-procedure 122 and represents another sub-procedure for balancing the load in a weighted flow network. Each one of sub-procedures 122 and 124 can be used as separate sub-procedures for executing procedure 106 without sub-procedure 120. In this sub-procedure, a large data set about the flow and balance of the weighted flow network is required. Such a large data set may be attainable after a weighted flow network has been monitored, including its metrics, for a significant amount of time such as a year or two. With a large data set, a machine learning algorithm can learn what is the ideal number of best routes to select in procedure 104 (FIG. 3A) as well as how best to split the percentages of transferred goods, objects and data over those determined best routes. In this sub-procedure, the weighted flow network can essentially learn by itself how best to globally optimize and load balance. It is noted that according to the disclosed technique, the at least one machine learning algorithm can be a supervised machine learning algorithm or an unsupervised machine learning algorithm. It is noted that it is within the knowledge of the worker skilled in the art to be able to develop algorithms, programs and applications to implement sub-procedures 120, 122 and 124 in order to execute procedure 106 (FIG. 3A) and thus load balance and globally optimize a weighted flow network according to the disclosed technique. It is noted that in the case of the disclosed technique being embodied as an apparatus, procedures 120-124 can be performed by a processor.

Reference is now made to FIGS. 4A-4D, which are schematic illustrations of a weighted flow network modeling a shortest path between a point of departure and a destination over a plurality of iterations using the method of FIGS. 3A and 3B, generally referenced 140-140''', operative in accordance with a further embodiment of the disclosed technique. In general, similar reference numerals are used throughout FIGS. 4A-4D to show similar elements in each of those figures, with an apostrophe symbol appended to a reference numeral to differentiate similar elements in different figures. Each of FIGS. 4A-4D shows the determination of a plurality of shortest paths between a vertex A, representing a point of departure and a vertex B, representing a destination, at different iterations of the method of FIGS. 3A and 3B. To keep the figures from being too cluttered, a simplified weighted flow network between vertices A and B is shown including only three vertices, six edges and one weight per edge, it being understood that a real world representation of the weighted flow network in FIGS. 4A-4D may include tens if not hundreds of vertices and edges, where each edge may include a plurality of weights.

Figure 4A:
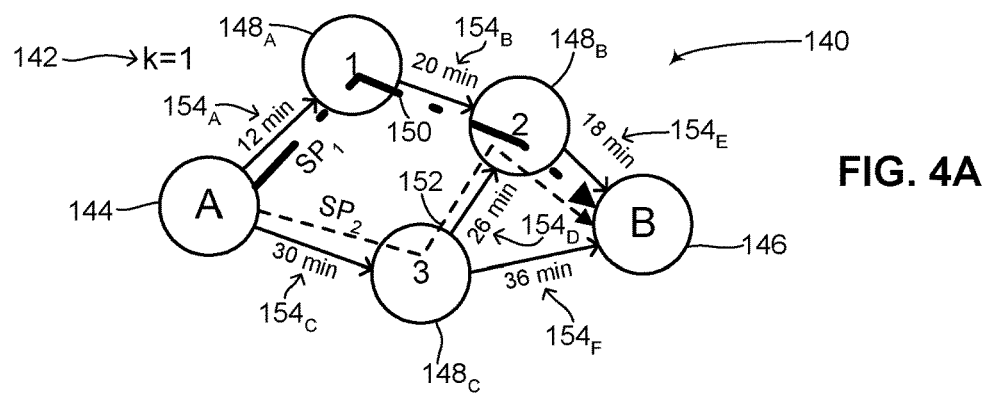
FIGS. 4A-4D are schematic illustrations of a weighted flow network modeling a shortest path between a point of departure and a destination over a plurality of iterations using the method of FIGS. 3A and 3B, operative in accordance with a further embodiment of the disclosed technique.

Reference is now made to FIG. 4A which includes a point of departure or source vertex 144, shown as a vertex A and a destination vertex 146, shown as a vertex B. Vertices 144 and 146 represent two different cities, such as Tel-Aviv and Jerusalem. FIG. 4A models the shortest path problem of a driver wanting to leave Tel-Aviv and arrive in Jerusalem at minimal time. Vertex A and vertex B are connected via a plurality of intermediate vertices $148_A$, $148_B$ and $148_C$ and edges $154_A$, $154_B$, $154_C$, $154_D$, $154_E$ and $154_F$. Vertices $148_A$, $148_B$ and $148_C$ are shown in FIG. 4A as vertices '1', '2' and '3'. Edge $154_A$ connects vertex A to vertex 1, edge $154_B$ connects vertex 1 to vertex 2, edge $154_C$ connects vertex A to vertex 3, edge $154_D$ connects vertex 3 to vertex 2, edge $154_E$ connects vertex 2 to vertex B and edge $154_E$ connects vertex 3 to vertex B. Each of edges $154_A$-$154_F$ represents major roads and highways between Tel-Aviv and Jerusalem, with vertices $148_A$, $148_B$ and $148_C$ representing major intersections of those roads and highways. As shown in FIG. 4A, each edge has an associated weight, the weight representing the amount of time required to travel on a particular road or highway at a given time. As mentioned before, the amount of time to travel a particular road or highway at a given time may be a function of the length of the road or highway as well as the traffic and congestion on the particular road or highway at a given time. Edge $154_A$ has a weight of 12 minutes, edge $154_B$ has a weight of 20 minutes, edge $154_C$ has a weight of 30 minutes, edge $154_D$ has a weight of 26 minutes, edge $154_E$ has a weight of 18 minutes and edge $154_F$ has a weight of 36 minutes. An iteration marker 142, using the variable 'k', is used to show the iteration during which the method of FIGS. 3A and 3B is used to determine the path a user should take to travel between Tel-Aviv and Jerusalem.

According to the disclosed technique, in procedure 100 (FIG. 3A), a plurality of metrics are collected for a given network. In FIG. 4A, the network is a road network linking the cities Tel-Aviv to Jerusalem, with Tel-Aviv being represented by vertex 144 and Jerusalem by vertex 146, the road network being a weighted flow network. Vertices $148_A$-$148_C$ represent major intersections between those two cities and edges $154_A$-$154_F$ represent major roads and highways that connect Tel-Aviv to Jerusalem. In order to keep FIGS. 4A-4D from being too cluttered and to compare it with the prior art methods described above, in particular in FIGS. 2A-2F, each edge in FIGS. 4A-4D includes only one weight. However each edge in weighted flow network 140 may include a plurality of metrics, such as distance, average travel speed, toll fee if applicable, a safety indicator for use of the road and the like. As mentioned above, the plurality of metrics may be represented by a single function combining all the individual metrics together. The metrics collected can also include traffic patterns culled from websites which monitor the dynamics of how traffic patterns change in weighted flow network 140 over the course of a 24-hour period and even over the course of extended time periods, such as a year.

In procedure 102 (FIG. 3A), a plurality of user requests is received for a route from a first node to a second node in the network. In FIG. 4A, this is represented as a first iteration, where iteration marker 142 has k=1. A system, program or application may receive a plurality of requests for an optimal route for driving from Tel-Aviv to Jerusalem. In procedure 104 (FIG. 3A), K best routes out of N possible routes, are determined for travelling from Tel-Aviv to Jerusalem based on the collected metrics. As shown in FIG. 4A, weighted flow network 140, as a directed graph, shows three possible routes from Tel-Aviv to Jerusalem, i.e., vertex A to vertex B. A first route is from vertex A to vertex 1, vertex 1 to vertex 2 and vertex 2 to vertex B. A second route is from vertex A to vertex 3, vertex 3 to vertex 2 and vertex 2 to vertex B. A third route is from vertex A to vertex 3 and vertex 3 to vertex B. Of these three possible routes, according to procedure 104, two best routes are determined based on the collected metrics. Since the only metric shown in FIG. 4A is the average travel time over a particular edge, the best routes are selected based on shortest travel time. A first best route 150, shown as $SP_1$ in the figure and equal to the first route just described, as well as a second best route 152, shown as $SP_2$ in the figure and equal to the second route just described, are determined in procedure 104. $SP_1$ (i.e., 50 minutes total travel time) is more optimal than $SP_2$ (i.e., 56 minutes total travel time) based on the metrics of each edge.

In a procedure 106 (FIG. 3A), the load in the network is balanced by distributing the plurality of route requests over the K best routes from the first node to the second node. In FIG. 4A, the plurality of user requests received during k=1 are distributed over $SP_1$ and $SP_2$. For example, if twenty-five (25) user requests were received during k=1, twenty user requests might be answered by returning the best route as $SP_1$, where five user requests might be answered by returning the second best route as $SP_2$. As explained above, according to the disclosed technique, $SP_2$ may not be the best route for the five user requests which received $SP_2$ as an answer to their query on a local level, i.e., individually for those five users. However on a more global level, $SP_2$ is the best route for those five users to drive down for the sake of the entire weighted flow network. This is shown graphically in FIG. 4A by the thickness of the line representing $SP_1$ as compared to the thickness of the line representing $SP_2$. By distributing route requests over weighted flow network 140, the load on the network is balanced and the capacity which the network can handle is optimized.

Figure 4B:
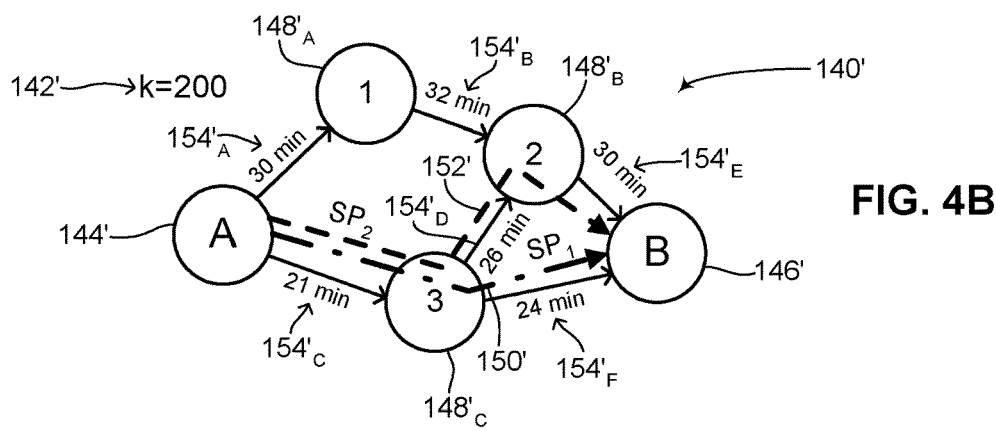

Reference is now made to FIG. 4B, which shows the same weighted flow network as in FIG. 4A, except with an iteration marker 142' now showing k=200. In procedure 108 (FIG. 3A), the plurality of metrics of the network are updated. FIG. 4B represents another plurality of user queries, submitted to the same program or application as in FIG. 4A, again requesting how to drive from Tel-Aviv to Jerusalem in the shortest amount of time. As shown, the weights of edges $154'_A$-$154'_F$ are all different than the weights of edges 154A-154F (FIG. 4A), as some time may have elapsed between the user queries of FIG. 4A and the user queries of FIG. 4B. Traffic patterns may have changed in weighted flow network 140', certainly based on how the users who submitted user queries in FIG. 4A actually decided to drive from Tel-Aviv to Jerusalem. As mentioned above, in the example of a traffic optimization application, the method of the disclosed technique merely gives recommendations and thus cannot control if a user actually drives down the route returned to him or her. Therefore it is expected that over time traffic patterns will change somewhat unpredictably as the traffic optimization application does not control which routes drivers will ultimately select to drive down from their source point to their destination point. The metrics per edge therefore will change somewhat unpredictably as well. Thus according to procedure 108, the metrics of weighted flow network 140' have been updated. In addition, as shown in FIG. 3A, once the metrics of the network have been updated, new user requests are received and can be processed, with the method returning to procedure 102. This is shown in FIG. 4B as new user requests for travelling from Tel-Aviv to Jerusalem in the shortest amount of time with k=200. In FIG. 4B, the K best routes determined have changed as compared to FIG. 4A. A first best route 150' is now from vertex A to vertex 3 and vertex 3 to vertex B. However a second best route 152' is the same as second best route 152 (FIG. 4A). Based on the thicknesses of the lines representing $SP_1$ and $SP_2$ in FIG. 4B, the user requests by the time k=200 are evenly distributed between $SP_1$ and $SP_2$.

Figure 4C:
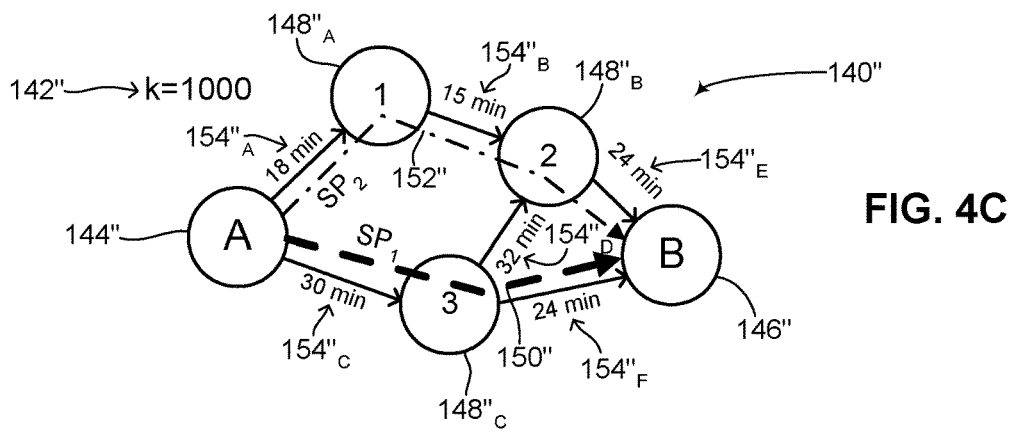

Reference is now made to FIG. 4C, wherein k=1000. In FIG. 4C, the K best routes determined have changed slightly as compared to FIGS. 4A and 4B, as the metrics in weighted flow network 140" have changed. A first best route 150" is now the same as first best route 150' (FIG. 4B). A second best route 152" is now from vertex A to vertex 1, vertex 1 to vertex 2 and vertex 2 to vertex B, equivalent to first best route 150 (FIG. 4A) above in FIG. 4A. Based on the thicknesses of the lines representing $SP_1$ and $SP_2$ in FIG. 4C, the user requests by the time k=1000 are distributed similarly between $SP_1$ and $SP_2$ as they were distributed above in FIG. 4A.

Figure 4D:
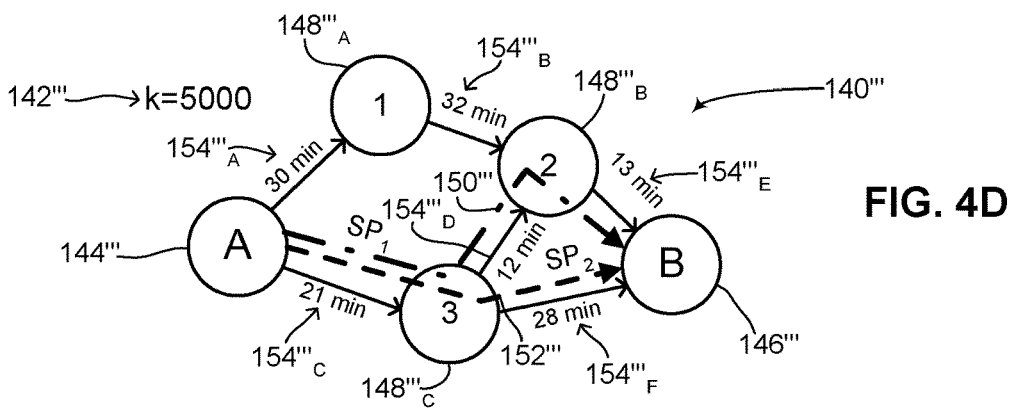

Reference is now made to FIG. 4D, wherein k=5000. In FIG. 4D, the K best routes determined have again changed slightly as compared to FIGS. 4A-4C, as the metrics in weighted flow network 140'" have changed. A first best route 150'" and a second best route 152'" are substantially similar to first best route 150' (FIG. 4B) and second best route 152' (FIG. 4B), however their optimizations are reversed, as $SP_1$ in FIG. 4D is equal to $SP_2$ in FIG. 4B and $SP_2$ is FIG. 4D is equivalent to $SP_1$ in FIG. 4B. Based on the thicknesses of the lines representing $SP_1$ and $SP_2$ in FIG. 4D, the user requests by the time k=5000 are substantially distributed evenly between $SP_1$ and $SP_2$ as they were distributed above in FIG. 4B.

As can be seen above in FIGS. 4A-4D, the best routes between vertex A and vertex B do change over time, however the set of various best routes suggested according to the disclosed technique remain substantially the same. In addition, the average travel time between edges of the best routes determined remain substantially similar even after thousands of iterations of the method. In comparison to FIGS. 2A-2F, FIGS. 4A-4D show a number of differences between the prior art and the disclosed technique, as enumerated above. In FIGS. 2A-2F, each user request is returned with the best route to take at a given moment. The prior art ensures that a given user takes the best route at that moment, however as more and more users are returned the same best route over time, that best route may eventually become the slowest route to take. For example, edge $48_F$ (FIG. 2A) has a weight of 15 minutes, edge $48'''_F$ (FIG. 2D) has a weight of 41 minutes and edge $48''''_F$ (FIG. 2F) again has a weight of 15 minutes. Thus the difference in metrics in the network over time can fluctuate significantly in the prior art as user requests are returned with best routes that bounce users around the network in an attempt to give a user an optimal route for just that user. According to the disclosed technique, the best route returned to a user is the best route globally for the entire network and might not objectively be the most optimal route for a user at a given moment. However overall, by properly distributing a load over a weighted flow network, the capacity of the weighted flow network can be increased to an optimal level. As mentioned above, the disclosed technique takes a utilitarian approach to globally optimizing a weighted flow network such that the largest amount of goods, objects or data can be transferred through a weighted flow network from a source to a destination in the fastest time possible. According to the disclosed technique, this is possible by maintaining a balanced load over a weighted flow network. Optimizing the load over the entire network enables the metric or weight of edges in the network to not fluctuate too much and to remain more constant and consistent. For example, the weight of edges $154_C$, $154'_C$, $154''_C$, $154'''_C$ fluctuates between 30 minutes and 21 minutes as shown in FIGS. 4A-4D over thousands of iterations. This balances the load on the network and might contribute to an increase in capacity of the network if it is properly balanced.

It is noted, as mentioned above, that the disclosed technique can be used in other weighted flow networks and is not limited to the example shown above in FIGS. 4A-4D. Another use of the disclosed technique is in routing information through complex networks such as the Internet, a content delivery network, a company's intranet, a proprietary data network and the like. User requests may be sent to a server in such networks for retrieving information from a website, proxy server, database and the like. According to the disclosed technique, user requests can be answered by returning best routes through the network for retrieving the information without overloading a particular route which at a given moment might be the best route. By balancing such networks, browsing speeds can be significantly increased for users of those networks. Using the example of a proprietary data network, large scale metrics about the entire network might be known to the company running the data network. Such metrics might include throughput, jitter, latency and round trip time, as well as derived metrics of throughput, jitter, latency and round trip time of each node and/or edge in the data network. Such a data network might have millions of nodes and metrics may be updated at a resolution of a few seconds, generating a large data set. Such large data sets can be continuously put into a database from which trends and patterns can be determined over time. Users of such data networks may be continuously sending data requests over the data network. Using the disclosed technique, a plurality of K best routes (for example $SP_1$, $SP_2$, $SP_3$ ... $SP_K$) can be determined using the metrics in such a database. In addition, the metrics can be used to determine what percentage of the data requests (i.e., the network traffic) should be transmitted over the plurality of K best routes (for example X % of network traffic over $SP_1$, Y % of network traffic over $SP_2$, Z % of network traffic over $SP_3$ . . . α % of network traffic over $SP_K$). In this respect, network traffic over the proprietary data network is optimized at a global level for the entire data network. It is noted as well that in the case of a weighted data network, such as a proprietary network, an intranet and the like, the weighted data network may also control how data is actually transferred through the network. Therefore unlike the example given above in FIGS. 4A-4D where only a recommendation for a route is given or returned per user request, the weighted data network can exert control over how information is moved through the weighted data network thus increasing the ability of the network to remain balanced and globally optimized according to the disclosed technique. As example of this is given below in FIG. 5. It is also noted that the disclosed technique can be embodied as an application or program and run on a computer, server, mobile device, tablet computer, virtual machine, virtual device, virtual server and the like. The disclosed technique can also be embodied as an apparatus for running such an application or program.

Figure 5:
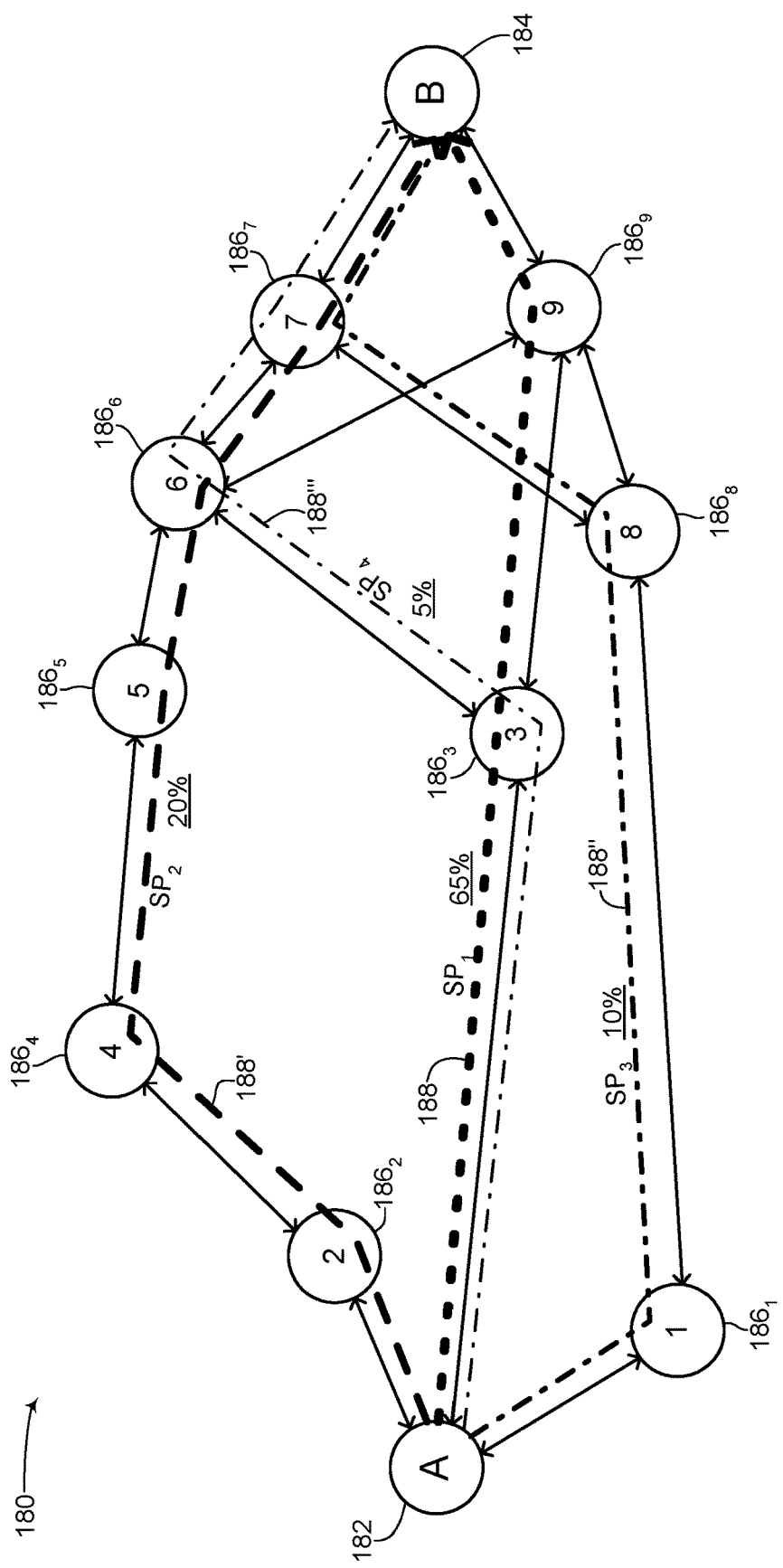
FIG. 5 is a schematic illustration of a weighted flow network which is globally optimized and load balanced using the method of FIGS. 3A and 3B, operative in accordance with another embodiment of the disclosed technique.

Reference is now made to FIG. 5, which is a schematic illustration of a weighted flow network which is globally optimized and load balanced using the method of FIGS. 3A and 3B, generally referenced 180, operative in accordance with another embodiment of the disclosed technique. Weighted flow network 180 is a data network, such as the Internet, an intranet or a proprietary network. In weighted flow network 180, the transfer and movement of data within the network is controlled such that data within the network can be forced to take a specific path or route between a source node and a destination node. Weighted flow network 180 includes a source node 182, labeled 'A' and a destination node 184, labeled S'. Source node 182 made be a server, a proxy, a remote computer, a website and the like and may be physical or virtual. Destination node 184 made also be a server, a proxy, a remote computer, a website and the like and may also be physical or virtual. Source node 182 is coupled to destination node 184 via weighted flow network 180 which includes a plurality of intermediate vertices $186_1$-$186_9$, each labeled respectively '1' through '9'. Each of vertices $186_1$-$186_9$ may again be a server, proxy, remote computer, website and the like and may be physical or virtual. As shown source node 182 is coupled with vertices $186_1$-$186_3$, vertex $186_1$ is coupled with vertex $186_8$, vertex $186_2$ is coupled with vertex $186_4$, vertex $186_3$ is coupled with vertices $186_6$ and $186_9$, vertex $186_4$ is coupled with vertex $186_5$, vertex $186_5$ is coupled with vertex $186_6$, vertex $186_6$ is coupled with vertices $186_7$ and $186_9$, vertex $186_7$ is coupled with vertex $186_8$ and destination node 184, vertex $186_8$ is coupled with vertex $186_9$ and vertex $186_9$ is coupled with destination node 184. In order to reduce clutter, weighted flow network 180 is shown having nine vertices besides source node 182 and destination node 184, it being understood by the worker skilled in the art that a weighted data network may include thousands of vertices between a source node and a destination node. In addition, a plurality of edges (not labeled) couples most vertices together, with each edge having an associated weight or metric (also not shown). As shown, each edge is bidirectional and can transfer or move data in either direction.

FIG. 5 shows a weighted data network which has already been load balanced and globally optimized according to the disclosed technique, i.e., after procedures 100-108 (FIG. 3A) have already been executed. Source node 182 may be for example a portal site for downloading videos whereas destination node 184 may be the server hosting the videos. Source node 182 may be in one continent (such as North America) whereas destination node may be in a different continent (such as Europe). Vertices $186_1$-$186_9$ may thus be spread out over different countries (not shown). According to the disclosed technique, in procedure 104 (FIG. 3A), four best routes are determined between source node 182 and destination node 184. The four best routes are shown as a best route 188, labeled $SP_1$, a second best route 188', labeled $SP_2$, a third best route 188", labeled $SP_3$ and a fourth best route 188''', labeled $SP_4$. The four best routes have been determined after a plurality of iterations of procedure 102-108 (FIG. 3A). In procedure 106 (FIG. 3A), the load in weighted data network 180 has been distributed as follows: 65% of the load is transferred via $SP_1$, 20% of the load is transferred via $SP_2$, 10% of the load is transferred via $SP_3$ and 5% of the load is transferred via $SP_4$. The thickness of each of best route 188, second best route 188', third best route 188" and fourth best route 188''' as shown in FIG. 5 is indicative of how much of the load is handled by each best route. As shown in FIG. 5, when users send data requests to source node 182 to download a video from destination node 184, the data requests are handled according to the distribution and load balancing shown in FIG. 5. Unlike a traffic optimization application, in a weighted data network, such as a proprietary network, the network can decide how data from the source node will be transferred to the destination node and back. As mentioned, this is different than certain applications useable with the disclosed technique in which requests from users merely return recommendations for routes in the network but cannot force users to use those routes. Thus weighted flow network 180 can be maintained in a load balanced state over time since the network can decide how data flowing through it is to be handled. As mentioned above, according to the disclosed technique, the number of best routes, the determined best routes as well as the distribution percentages for data to be handled by each determined best route can be changed and modified over time as a function of available metrics for each vertex and each edge in weighted flow network 180.

It will be appreciated by persons skilled in the art that the disclosed technique is not limited to what has been particularly shown and described hereinabove. Rather the scope of the disclosed technique is defined only by the claims, which follow.

The invention claimed is:

1. A method for load balancing a data network, comprising the procedures of:
    collecting, during a first period of time, training data that includes a plurality of metrics of said data network, comprising collecting at least a capacity of data transfer, a latency, a round trip time, and an actual monetary cost for using a particular connection, for connections between nodes of the data network, the data network including a plurality of network servers connected over a network and operable to route requests, the plurality of network servers corresponding to nodes;
    training a machine model, by the plurality of network servers, using the training data to generate a trained machine model operable to process metric data associated with the data network to determine a set of routes out of a plurality of routes to transfer data between nodes of the data network and a distribution metric to assign a percentage of a load to individual routes of the set of routes;
    receiving a plurality of route requests to transfer data from a first node of the nodes to a second node of the nodes;
    obtaining, during a second period of time, a set of metrics associated with the data network, the second period of time being different from the first period of time and occurring when receiving the plurality of route requests;
    processing the set of metrics with the trained machine model during the second period of time to determine a set of routes from said first node to said second node and a distribution metric for the set of routes;
    assigning a percentage of a load to be handled by individual routes of the set of routes based at least in part on the distribution metric;
    transmitting information as computer readable instructions to control transfer and movement of the plurality of route requests over the set of routes between the first node and the second node based on the percentage of the load assigned to the individual routes;
    obtaining, during a third period of time, additional metrics subsequent the plurality of route requests, the third period of time being different from the first period of time and the second period of time and occurring concurrently with controlling the transfer and the movement of the plurality of route requests;
    updating the trained machine model during the third period of time to generate an updated set of routes and updated distribution metric based at least in part on the additional metrics; and
    maintaining a load distribution based at least in part on the updated set of routes and the updated distribution metric including reassigning the percentage of the load to be handled by individual routes of the updated set of routes based at least in part on the updated distribution metric.

2. The method according to claim 1, further comprising:
    iteratively determining an optimized load distribution based at least in part on the trained machine model and the set of metrics; and
    preconfiguring said optimized load distribution of said plurality of route requests regarding a number of said set of routes and the percentage of the load in said data network transferred per the individual routes.

3. The method according to claim 2, further comprising:
    dynamically modifying preconfigured optimized load distribution of said plurality of route requests at predetermined time intervals via human intervention.

4. The method according to claim 1, wherein said machine model is selected from a list consisting of: a supervised machine learning algorithm; and an unsupervised machine learning algorithm.

5. The method according to claim 2, wherein said preconfigured optimized load distribution and said percentage is hardwired.

6. The method according to claim 1, wherein collecting the set of metrics further comprises culling data traffic patterns from websites that monitor a dynamic flow of how the data traffic patterns change over a period of time.

7. The method according to claim 1, wherein said data network comprises a virtual flow network.

8. The method according to claim 1, wherein said data network comprises a controlled weighted flow network.

9. The method according to claim 1, wherein said data network comprises a plurality of nodes and edges.

10. The method according to claim 9, wherein said plurality of nodes and edges are selected from a list consisting of: physical entities; and virtual entities.

11. The method according to claim 1, wherein said plurality of metrics are represented by a plurality of weights.

12. The method according to claim 1, wherein said plurality of metrics comprises a plurality of derived metrics.

13. The method according to claim 1, wherein said plurality of metrics are stored in a data structure.

14. The method according to claim 13, wherein said data structure is selected from a list consisting of: a hash table; a database; a linked list; and an array.

15. The method according to claim 1, wherein said procedure of determining the set of best routes out of possible routes is executed using a complex shortest path algorithm.

16. The method according to claim 15, wherein said complex shortest path algorithm is a K-shortest path routing algorithm.

17. The method according to claim 16, wherein said K-shortest path routing algorithm is selected from a list consisting of: an extension to Dijkstra's algorithm; an extension to a Bellman Ford algorithm; and Yen's algorithm for K-shortest loopless paths.

18. The method according to claim 1, wherein said procedures of collecting, learning, receiving, processing, selecting, updating and maintaining are executed iteratively to determine a plurality of sub-routes in a sub-network of said data network.

19. The method according to claim 1, wherein said procedures of collecting, learning, receiving, processing, selecting, updating and maintaining are executed recursively to determine a plurality of sub-routes in a sub-network of said data network.

20. The method according to claim 1, wherein said plurality of metrics is selected from a list consisting of:
  a capacity of data transfer;
  jitter;
  latency; round trip time;
  an actual monetary cost for using a particular connection;
  a derived metric of throughput;
  a derived metric of jitter;
  a derived metric of latency; and
  a derived metric of round trip time.

21. The method according to claim 1, wherein said data network comprises an Internet.

22. Apparatus for load balancing a data network, comprising:
  a metric collector, for collecting training data, during a first period of time, that includes a plurality of metrics in said data network, including collecting at least a capacity of data transfer, a latency, a round trip time, and an actual monetary cost for using a particular connection, for connections between nodes of the data network, the data network including a plurality of network servers connected over a network and operable to route requests, the plurality of network servers corresponding to nodes;
  the plurality of network servers comprising operative to train a machine model using the training data to generate a trained machine model operable to process metric data associated with the data network to determine a set of routes out of a plurality of routes to transfer data between nodes of the data network and a distribution metric to assign a percentage of a load to individual routes of the set of routes;
  a route request receiver, for receiving a plurality of route requests to transfer data from a first node of the nodes to a second node of the nodes; and
  a processor, for:
    obtaining, during a second period of time, a set of metrics associated with the data network, the second period of time being different from the first period of time and occurring when receiving the plurality of route requests;
    processing the set of metrics with the trained machine model during the second period of time to determine a set of routes from said first node to said second node and a distribution metric for the set of routes;
    assigning a percentage of a load to be handled by individual routes of the set of routes based at least in part on the distribution metric;
    transmitting information as computer readable instructions to control transfer and movement of the plurality of route requests over the set of routes between the first node and the second node based on the percentage of the load assigned to the individual routes; and
    obtaining, during a third period of time, additional metrics subsequent the plurality of route requests, the third period of time being different from the first period of time and the second period of time and occurring concurrently with controlling the transfer and the movement of the plurality of route requests;
    updating the trained machine model during the third period of time to generate an updated set of routes and updated distribution metric based at least in part on the additional metrics; and
  wherein said processor maintains a load distribution based at least in part on the updated set of routes and the updated distribution metric including reassigning the percentage of the load to be handled by individual routes of the updated set of routes based at least in part on the updated distribution metric.

23. The apparatus according to claim 22, wherein said processor:
  dynamically modifies preconfigured optimized load distribution of said plurality of route requests at predetermined time intervals via human intervention.

* * * * *